(12) United States Patent
Huang et al.

(10) Patent No.: US 9,770,100 B2
(45) Date of Patent: Sep. 26, 2017

(54) AUTONOMOUS TROLLEY SYSTEM

(71) Applicant: Driessen Aerospace Group N.V., Alkmaar (NL)

(72) Inventors: Kevin Huang, Hermosa Beach, CA (US); Lucas Nastase, Lahnau (DE); Tom Schreuder, Wassenaar (NL); Andreas Hoogeveen, Enkhuizen (NL); Adriaan Eijkelenboom, Schoonhoven (NL); Cyril Morozeau, Colomiers (FR); Olivier Zarrouati, Paris (FR)

(73) Assignee: Driessen Aerospace Group N.V., Alkmaar (NL)

( * ) Notice: Subject to any disclaimer, the term of this patent is extended or adjusted under 35 U.S.C. 154(b) by 0 days.

(21) Appl. No.: 15/260,735

(22) Filed: Sep. 9, 2016

(65) Prior Publication Data

US 2016/0374465 A1 Dec. 29, 2016

Related U.S. Application Data

(63) Continuation of application No. 14/384,776, filed as application No. PCT/IB2013/051999 on Mar. 13, 2013, now Pat. No. 9,445,665.

(Continued)

(51) Int. Cl.
*A47B 31/02* (2006.01)
*B64D 11/00* (2006.01)
(Continued)

(52) U.S. Cl.
CPC .............. *A47B 31/02* (2013.01); *A47B 31/06* (2013.01); *B64D 11/0007* (2013.01);
(Continued)

(58) Field of Classification Search
None
See application file for complete search history.

(56) References Cited

U.S. PATENT DOCUMENTS 5,579,871 A * 12/1996 Emmrich ............ B60B 33/0042
16/35 R
7,553,571 B2 6/2009 Becerra et al.
(Continued)

FOREIGN PATENT DOCUMENTS

CA 2700658 A1 4/2009
CN 101808901 A 8/2010
(Continued)

OTHER PUBLICATIONS

Internatonal Patent Application No. PCT/IB2013/051999, Search Report and Writte Opinion dated Nov. 13, 2013.
(Continued)

*Primary Examiner* — J. Allen Shriver, II
*Assistant Examiner* — Hilary L Johns
(74) *Attorney, Agent, or Firm* — Kilpatrick Townsend & Stockton LLP; Dean W. Russell; Kristin M. Crall

(57) ABSTRACT

Autonomous trolleys include an integrated power source, which energy can be utilized for integrated trolley systems such as a wheel assist module, heating module, and cooling module. The power source may include a fuel cell system or a rechargeable electrical energy storage device or a combination thereof. The rechargeable electrical energy storage device can be charged by any other power source, including a fuel cell system. The trolley can also be equipped with a fuel tank for easy and safe refueling of a fuel cell system.

22 Claims, 3 Drawing Sheets

Related U.S. Application Data

(60) Provisional application No. 61/734,645, filed on Dec. 7, 2012, provisional application No. 61/670,232, filed on Jul. 11, 2012, provisional application No. 61/663,775, filed on Jun. 25, 2012, provisional application No. 61/610,025, filed on Mar. 13, 2012.

(51) Int. Cl.
  *A47B 31/06* (2006.01)
  *A47B 31/00* (2006.01)
  *B64D 41/00* (2006.01)

(52) U.S. Cl.
  CPC ......... *A47B 31/00* (2013.01); *A47B 2031/002* (2013.01); *A47B 2031/003* (2013.01); *A47B 2031/023* (2013.01); *B64D 2041/005* (2013.01); *Y02T 90/36* (2013.01)

(56) References Cited

U.S. PATENT DOCUMENTS

| | | |
|---|---|---|
| 8,141,185 B2 | 3/2012 | Hoffjann et al. |
| 8,232,670 B2 | 7/2012 | Breit et al. |
| 2004/0043276 A1 | 3/2004 | Hoffjann et al. |
| 2004/0057177 A1 | 3/2004 | Glahn et al. |
| 2006/0138278 A1 | 6/2006 | Gans |
| 2007/0110861 A1 | 5/2007 | Hoffjann et al. |
| 2007/0172707 A1 | 7/2007 | Hoffjann et al. |
| 2007/0248851 A1 | 10/2007 | Wallace et al. |
| 2008/0001026 A1* | 1/2008 | Hoffjann ............... B64D 11/02 244/58 |
| 2008/0038597 A1 | 2/2008 | Hoffjann et al. |
| 2008/0120187 A1 | 5/2008 | Wesley et al. |
| 2008/0133076 A1 | 6/2008 | Formanski et al. |
| 2009/0169967 A1* | 7/2009 | Wang ............... H01M 8/04208 429/404 |
| 2010/0140890 A1 | 6/2010 | Boivin et al. |
| 2010/0193629 A1 | 8/2010 | Breit et al. |
| 2010/0221642 A1 | 9/2010 | Frahm et al. |
| 2010/0225163 A1* | 9/2010 | Knepple ............... B64D 11/04 307/9.1 |
| 2010/0233552 A1 | 9/2010 | Knepple et al. |
| 2011/0277489 A1* | 11/2011 | Schalla ............... A47B 31/02 62/89 |
| 2013/0210329 A1 | 8/2013 | God et al. |
| 2015/0041100 A1 | 2/2015 | Huang et al. |

FOREIGN PATENT DOCUMENTS

| | | | |
|---|---|---|---|
| DE | 19809297 A1 | 9/1999 | |
| DE | 102006042300 B4 | 9/2008 | |
| DE | 102007022560 A1 * | 11/2008 | ............. A47B 31/02 |
| DE | 102007054291 A1 | 4/2009 | |
| EP | 2213571 B1 | 8/2010 | |
| EP | 2386811 A2 | 11/2011 | |
| WO | 0243528 A1 | 6/2002 | |
| WO | 2006058774 A2 | 6/2006 | |
| WO | 2007039211 A1 | 4/2007 | |
| WO | 2007057188 A1 | 5/2007 | |
| WO | 2011089016 A2 | 7/2011 | |
| WO | 2013136283 | 9/2013 | |

OTHER PUBLICATIONS

Internatonal Patent Application No. PCT/IB2013/051999, International Preliminary Report on Patentability dated Sep. 24, 2014.
Chinese Patent Application No. 2013800132841, Examination Report (and English translation) dated Sep. 2, 2015.
Chinese Patent Application No. 2013800132841, Office Action (and English translation) dated Apr. 18, 2016.
Singapore Patent Application No. 11201405404T, Written Opinion and Search Report dated Sep. 3, 2015.
Singapore Patent Application No. 11201405404T, Invitation to Responde to Written Opinion dated Apr. 22, 2016.
U.S. Appl. No. 14/384,776, Non-Final Office Action dated Oct. 8, 2015.
U.S. Appl. No. 14/384,776, Final Office Action dated Feb. 17, 2016.
U.S. Appl. No. 14/384,776, Notice of Allowance dated May 20, 2016.

* cited by examiner

AUTONOMOUS TROLLEY SYSTEM

CROSS-REFERENCES TO RELATED APPLICATIONS

This application is a continuation of U.S. Nonprovisional Application Ser. No. 14/384,776, entitled "AUTONOMOUS TROLLEY SYSTEM," filed Sep. 12, 2014 as the U.S. national phase entry of PCT/IB2013/051999, filed Mar. 13, 2013, which claims the benefit of U.S. Provisional Application Ser. No. 61/610,025, entitled "IDEAS USING A FC (FUEL CELL) FOR GALLEYS, LAVATORIES AND TOILET SYSTEM," filed Mar. 13, 2012 ; U.S. Provisional Application Ser. No. 61/663,775, entitled "TROLLEY INNOVATIONS," filed Jun. 25, 2012 ; U.S. Provisional Application Ser. No. 61/670,232, entitled "GALLEY INNOVATIONS (2)," filed Jul. 11, 2012; and U.S. Provisional Application Ser. No. 61/734,645, entitled "GALLEY AND LAVATORY AND OTHER POWER CONSUMER(S) POWERED BY A FUEL CELL," filed Dec. 7, 2012 . The entire disclosure of each is hereby incorporated herein by reference.

BACKGROUND OF THE INVENTION

A number of components on-board an aircraft require electrical power for their activation. Many of these components are separate from the electrical components that are actually required to run the aircraft (i.e., the navigation system, fuel gauges, flight controls, and hydraulic systems). For example, aircraft also have catering equipment, heating/cooling systems, lavatories, power seats, water heaters, and other components that require power as well. Specific components that may require external power include but are not limited to trash compactors (in galley and/or lavatory), ovens and warming compartments (e.g., steam ovens, convection ovens, bun warmers), optional dish washer, freezer, refrigerator, coffee and espresso makers, water heaters (for tea), air chillers and chilled compartments, galley waste disposal, heated or cooled bar carts/trolleys, surface cleaning, area heaters, cabin ventilation, independent ventilation, area or spot lights (e.g., cabin lights and/or reading lights for passenger seats), water supply, water line heating to prevent freezing, charging stations for passenger electronics, electrical sockets, vacuum generators, vacuum toilet assemblies, grey water interface valves, power seats (e.g., especially for business or first class seats), passenger entertainment units, emergency lighting, and combinations thereof. These components are important for passenger comfort and satisfaction, and many components are absolute necessities.

However, one concern with these components is their energy consumption. As discussed, galley systems for heating and cooling are among several other systems aboard the craft which simultaneously require power. Frequently, such systems require more power than can be drawn from the aircraft engines' drive generators, necessitating additional power sources, such as a kerosene-burning auxiliary power unit (APU) (or by a ground power unit if the aircraft is not yet in flight). This power consumption can be rather large, particularly for long flights with hundreds of passengers. Additionally, use of aircraft power produces noise and $CO_2$ emissions, both of which are desirably reduced. Accordingly, it is desirable to identify ways to improve fuel efficiency and power management by providing innovative ways to power these components.

Galleys and lavatories are connected to the aircraft potable water tank, and water is required for many of the related on-board services. Water pipes connect the water tank to the water consumers. For example, coffee cannot be made, passengers cannot use the lavatories, hand-washing water is not provided, and so forth, until the the APU or electrical switch is on in order to allow water to flow. Some examples of the water consumers on-board aircraft are the steam oven, beverage maker (coffee/espresso/tea), water boiler, tap water supply, dish washer, and the toilet vacuum system. Aircraft typically carry large amounts of potable water in the potable water tanks, which is uploaded when the aircraft is on the ground. A number of water saving attempts have been made to help re-use certain types of water onboard aircraft, but it is still desirable to generate new ways to generate and/or re-use water on-board aircraft. Other systems use heat, which is also typically generated by separate units. For example, heated water is desirable for use in warming hand-washing water (and to prevent freezing of the water pipes), the ovens and warmers onboard require heat, as well as the cabin heating units.

The present inventors have thus sought new ways to generate power to run on-board components, as well as to harness beneficial by-products of that power generation for other uses on-board passenger transport vehicles, such as aircraft.

The relatively new technology of fuel cells provides a promising cleaner and quieter means to supplement energy sources already aboard aircrafts. A fuel cell has several outputs in addition to electrical power, and these other outputs often are not utilized. Fuel cell systems combine a fuel source of compressed hydrogen with oxygen in the air to produce electrical and thermal power as a main product. Water and Oxygen Depleted Air (ODA) are produced as by-products, which are far less harmful than $CO_2$ emissions from current aircraft power generation processes.

Turning from this broad overview of aircraft systems as a whole in order to further address details of a specific component, one particular aircraft component of interest is trolleys. In commercial passenger crafts, and particularly in passenger aircrafts, trolleys are often used by the cabin crew to serve refreshments of food and drinks to the passengers. One way to utilize the trolleys for this purpose would be to store the refreshments in a central repository on the craft before embarkation and then transfer the refreshments to the trolleys for distribution to the passengers. However, to save space aboard the craft and improve efficiency of the cabin crew, the refreshments are usually pre-loaded into the trolleys before the flight or voyage. The trolleys are then stored in or nearby the galley and/or a monument where any needed further preparations to the refreshments may be completed during the trip.

Often the refreshments are to be served either heated or chilled. This can cause several issues in addition to the energy consumption concerns discussed above. For chilled items, the fact that the refreshments are pre-loaded onto the trolley normally requires the entire trolley to be placed in a chilled compartment. This limits the flexibility of the galley and the trolley because a trolley that needs to be chilled must be stored in a location with a chiller facility. For heated refreshments, the items must first be taken out of a chilled trolley, then put in a steam oven or other warming apparatus, and finally placed back into a trolley after being heated. This transferring, waiting for warming to finish, and transferring again consumes substantial amounts of the cabin crew's time to prepare meals during the voyage.

The weight of the trolley and the movement of the craft, like the climbing and declining of an airplane during flight, can make it hard to maneuver the trolley through the craft.

This presents a potential danger that a crew member will be unable to hold the trolley or will bump into a seat, with the resulting possibility of damaging the plane interior or hurting a person, either crew or passenger.

Additionally, galleys are bulky monuments, requiring a substantial amount of room aboard a craft. Their common location near the front of an aircraft cabin frequently necessitates that all passengers must walk through the galley while boarding the craft. This is problematic because the galley is intended for cabin crew use only and ideally should be maintained as a restricted area. Furthermore, it presents a bottle neck that impedes quick boarding.

BRIEF SUMMARY OF THE INVENTION

Accordingly, disclosed herein are improvements to trolleys over the drawbacks and limitations of existing trolleys. The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

As an example embodiment, a service trolley is provided for use in a craft, such as a commercial passenger aircraft. The trolley can have a container attached to a plurality of wheels, whereby the wheels are configured to support the container relative to a support surface, such as the passenger deck of an aircraft. The wheels facilitate movement of the container relative to the support surface. The service trolley can further include a power source. The power source can be housed at least partially on or at least partially within the container, and the power source can be configured for providing power to at least one system of the trolley. These systems can be housed at least partially on or at least partially within the container.

The trolley can include a number of different systems, either individually or in combination with one another. For example, the trolley can include a drive-assist system configured to assist at least one of the plurality of wheels to turn to move the trolley. The trolley can include a braking system configured to resist turning of at least one of the plurality of wheels to resist movement of the trolley. Also, the trolley can include a heating system for heating at least some contents of the trolley, and the trolley can include a cooling system for cooling at least some contents of the trolley. Additionally, the trolley can include a drink dispensing system, and the trolley can include a system for processing fruit into juice. The trolley may even include walls containing insulation.

The power source of the trolley can be any suitable power source or combination of suitable power sources. For example, the power source can include a heat source. In various embodiments, the power source can include a fuel cell system. The fuel cell system can include a replaceable fuel cartridge, and the fuel cartridge may be refillable. In some embodiments, the power source includes an electrical energy storage device (EES). Examples of EES are enclosed batteries and super capacitors. In some embodiments, the EES is rechargeable. The EES can be configurable for recharging from an electrical system of the craft, and the EES can be configurable for recharging from a fuel cell system.

In some embodiments, a system for recharging a EES-powered service trolley on a craft is provided. The system can include at least one EES-powered service trolley. The EES-powered service trolley can include a container and a plurality of wheels attached with the container, configured to support the container relative to a support surface, and configured to facilitate movement of the container relative to the support surface. The EES-powered service trolley also includes an EES housed at least partially within or on the container and configured for providing power to systems of the trolley. Furthermore, the EES-powered service trolley also can include a recharging connector configured to engage with the EES and to engage with at least one power connection to an electrical system of the craft for recharging of the EES. The system for recharging an EES-powered service trolley on a craft can also include at least one docking station position located on the craft and configured to receive at least one EES-powered service trolley for recharging. Each docking station position can include at least one power connection to an electrical system of the craft. The at least one power connection can be configured to engage with an electrical system of the craft and to engage with at least one recharging connector of at least one EES-powered service trolley for recharging at least one EES of at the least one EES-powered service trolley.

In some embodiments, at least one docking station position of the system for recharging a EES-powered service trolley is located in a cabin of the craft. In some embodiments, at least one docking station position is located in a cargo bay of the craft.

In some embodiments, a system for heating or cooling at least some contents of a service trolley on a craft is provided. The system can include at least one service trolley, which includes a container configurable to contain contents, a plurality of wheels attached with the container, and a fuel cell system fuel canister configurable to provide fuel to a fuel cell system. The fuel canister can contain gaseous, liquid, or solid fuel. The fuel canister can be any suitable shape for containing the fuel, including, but not limited to, bottle-like, box-like, cylindrical, rectangular, polygonal, and asymmetric. The fuel cell system fuel canister can be housed at least partially on or at least partially inside the container. The plurality of wheels can be configured to support the container relative to a support surface and to facilitate movement of the container relative to the support surface. The system can also include at least one docking station position located on the craft and configured to receive at least one service trolley for heating or cooling of contents of the at least one service trolley. In various embodiments, each docking station position includes at least one fuel cell system configured to receive fuel from at least one fuel canister of at least one service trolley. In some embodiments, the fuel cell system is further configured to power at least one temperature regulating module, and each docking station position further includes at least one temperature regulating module configured to be powered by fuel cell system. In various embodiments, the temperature regulating module is configurable for at least one of cooling or heating contents of at least one service trolley by power from the at least one fuel cell system.

In some embodiments, the system for heating or cooling at least some contents of a service trolley on a craft includes at least one fuel cell system which provides power to a galley of the craft. In some embodiments, at least one fuel cell system provides power to a lower deck storage of the craft. The trolley fuel canister can be removable, and/or it can be refillable.

For a fuller understanding of the nature and advantages of the present invention, reference should be made to the ensuing detailed description and accompanying drawings.

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Various embodiments involve trolleys which are autonomous from energy systems of the craft. Such a trolley contains an independent power source for powering systems individually targeted to a trolley and incorporated into the trolley, such as a temperature regulating system self-contained within the trolley for heating or cooling the contents of the trolley. The trolley's independent power source (such as a battery) may interface with infrastructure of the craft for recharging or refueling, but the systems can operate independently of this interface.

In some embodiments, a trolley can be semi-autonomous, containing a power or fuel source for powering systems which are individually targeted to the trolley but incorporated into the infrastructure of the craft. An example semi-autonomous trolley would dock with a wall in the galley, causing a fuel cartridge in the trolley to provide fuel for a wall-mounted power generator, which powers a temperature regulating system in the wall that heats or cools the contents of the trolley when it is docked. The trolley's power or fuel source is independent from the craft infrastructure, but it requires an interface with the infrastructure for the systems to operate.

Figure 1:
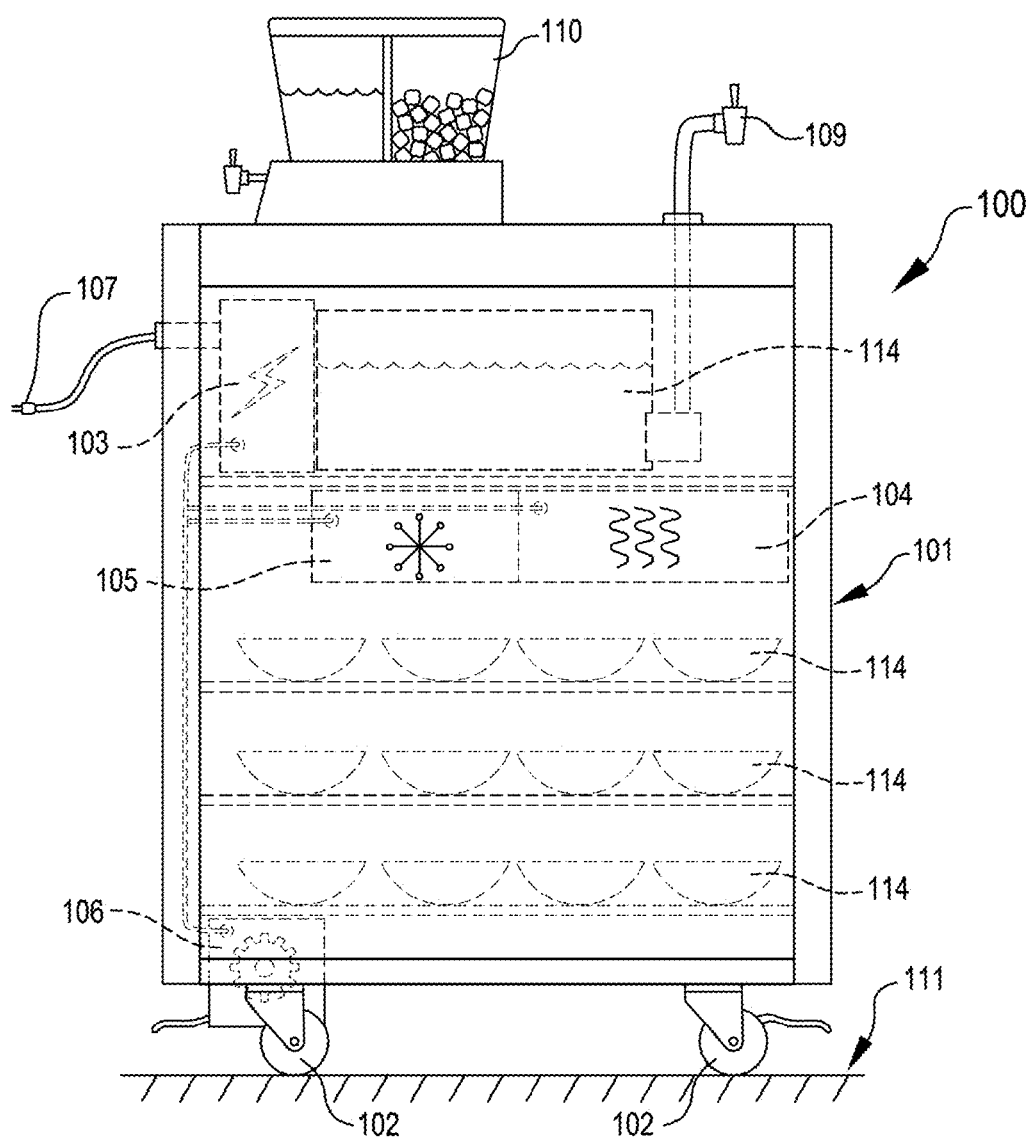
FIG. 1 is a side view of an autonomous trolley in accordance with embodiments.

Referring now to the drawings, in which like reference numerals represent like parts throughout the several views, FIG. 1 shows a side view of an autonomous trolley 100 in accordance with embodiments. In various embodiments, autonomous trolley 100 has a main container body 101 supported by wheels 102 relative to the support surface 111, often the deck of the craft. Container 101 has a power source 103. The power source 103 may be any suitable means for providing power, including but not limited to a battery, a fuel cell system, or a fuel-burning generator. In some embodiments, main container body 101 may be foldable, allowing the trolley to take up less space during stowage.

In various embodiments, autonomous trolley 100 has self-contained onboard systems. For example, autonomous trolley 100 can have a heating module 104 for heating contents 114 of the container 101 of trolley 100. In addition or in substitution, autonomous trolley 100 can have a cooling module 105 for cooling contents 114 of the container 101 of trolley 100. In addition or in substitution, autonomous trolley 100 can have a drink dispensing module 109 for dispensing contents 114 for drinking from the container 101 of trolley 100. For example, an autonomous trolley 100 could be equipped with just a coffeemaker. Furthermore, in addition or in substitution, autonomous trolley 100 can have a juicer module 110 for processing fruit into juice to be distributed from trolley 100. For example, an autonomous trolley 100 could be equipped with not only chillers, warmers, and a coffeemaker, but also a machine for pressing oranges into fresh-squeezed orange juice. The power generated by power source 103 provides the energy needed within the trolley to power these systems.

In various embodiments, the autonomous trolley 100 includes a wheel assist module 106 for improved control over wheels 102. In some embodiments, wheel assist module 106 may be used to prompt wheels 102 to rotate in a certain direction to propel the trolley that way, thereby acting as a drive-assist module. In some embodiments, wheel assist module 106 may be used to inhibit the wheels from rolling in a given direction, thereby providing a braking function and acting as a brake-assist module. In some embodiments, a brake-assist module can be configured to activate automatically and brake in response to conditions without the intervention of a crew member. In general, the wheel assist 106 can serve to reduce work required by crew during aircraft climb and general cabin maneuvering. The power source 103 onboard the trolley 100 provides the energy needed for the wheel assist module 106.

In various embodiments, the power source 103 has a connection 107 for interfacing with craft recharging systems 113 (not shown). For example, if the power source 103 is a rechargeable battery, craft recharging system 113 could correspond to an electrical system of the craft, and connection 107 provides a power plugin through which the battery can recharge. In another example, the power source 103 is a fuel cell system, craft recharging system 113 could correspond to fuel storage tank on the craft, and connection 107 provides a coupling hose for transferring fuel to the fuel cell system for recharging. In these embodiments, because all necessary equipment is onboard trolley 100 itself, the trolley 100 no longer needs a completely equipped galley, but only a storing location with a recharging plugin or access to any other energy storage. This can provide a substantial space savings aboard the craft.

Embodiments of autonomous trolley 100 also give much more flexibility to the galley. An autonomous trolley 100 with both a chilling module 105 and a heating module 104 can first chill the meals when the trolley 100 is stored and later on heat the meals before serving. With an autonomous trolley 100, the cabin crew no longer must take the meals out of the storage trolley and put them in to a steam oven and back in to the trolley when heated. This can provide substantial time savings for the cabin crew which can be better used for serving passengers, attending to other in-flight duties, or resting. Additionally, it can at least partially resolve a capacity problem currently experienced with dedicating space aboard a craft for separate steam ovens for meals because every trolley 100 can have its own designated heating component 104.

Figure 2:
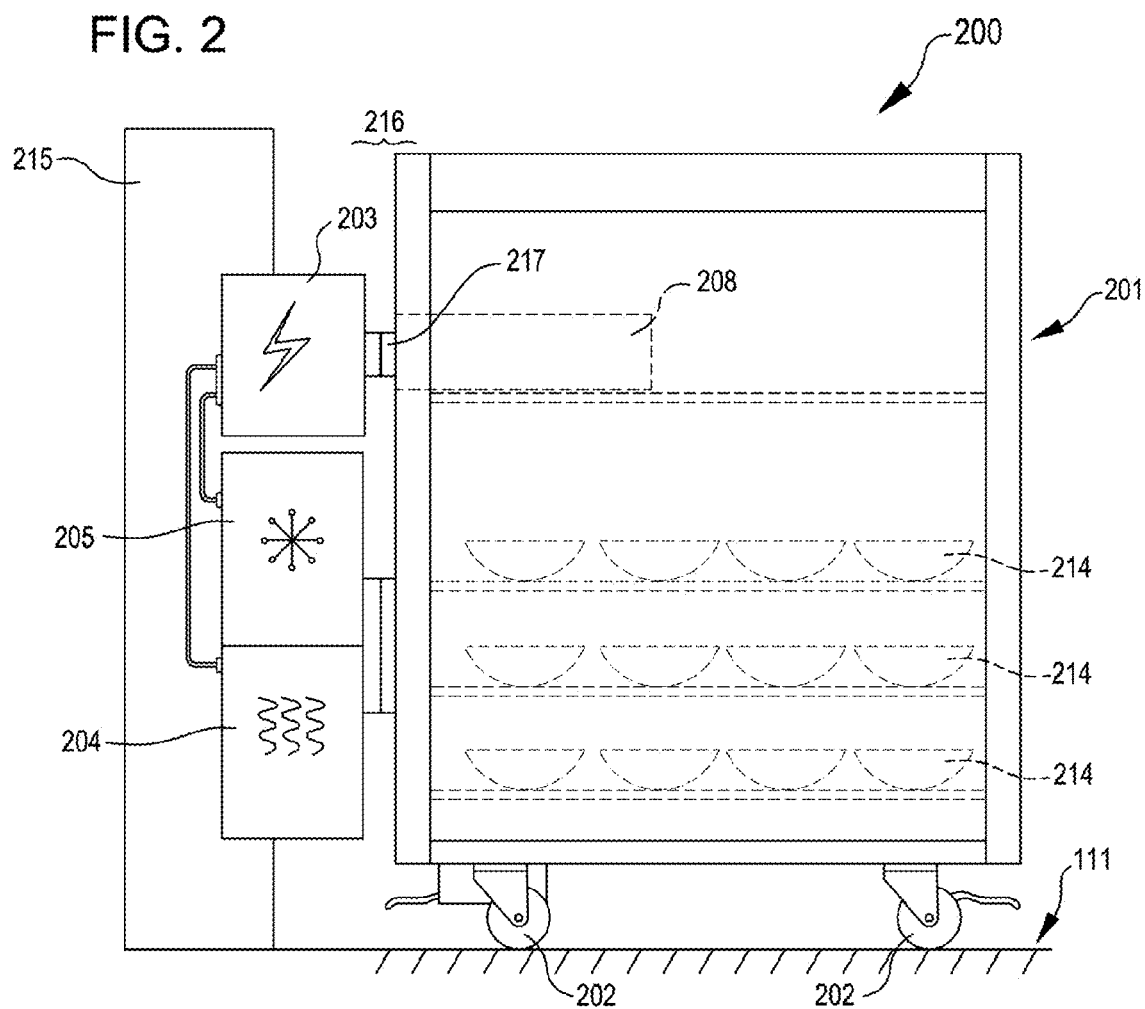
FIG. 2 is a side view of a semi-autonomous trolley in accordance with embodiments.

FIG. 2 shows a side view of a semi-autonomous trolley 200 in accordance with embodiments. In various embodiments, semi-autonomous trolley 200 has a main container body 201 supported by wheels 202 relative to the support surface 111. Outside and/or inside of container 201 is a power source 203. The power source 203 may be any suitable means for providing power, including but not limited to a battery, a fuel cell system, or a fuel-burning generator. Housed at least partially within or on container 201 is a recharging canister 208, which can provide energy storage required for power source 203.

In various embodiments, the semi-autonomous trolley 200 has a docking station position 216 in which recharging canister 208 can interface with power source 203. The docking station position 216 can be part of galley wall 215. The docking station position 216 may also include a heating module 204 or cooling module 205 capable of heating or cooling contents 214 of trolley 200 when trolley 200 is docked in docking station position 216. When contents 214 have reached a desired temperature, cabin crew may disengage trolley 200 from docking station position 216 and maneuver trolley 200 through the craft for distribution of contents 214 to passengers.

In various embodiments, the power source 203 is a fuel cell system. Fuel for this system can be stored in a gaseous, liquid, or solid state. In many embodiments, this system requires storage of hydrogen at high pressure. Due to the potential danger of handling high pressure hydrogen inside the craft, embodiments provide for refueling of high pressure storage tanks outside the aircraft. For example, trolley 200 may contain a hydrogen fuel tank such as canister 208 for easy and safe refueling of a fuel cell system of power source 203. Because canister 208 may be removed from the craft as part of trolley 200, canister 208 may be refueled under high pressure outside of the craft prior to embarkation. The canister 208 may further have a pressure reducer 217. The added pressure reducer 217 allows the cabin crew to handle low pressure hydrogen inside the craft instead of the high pressure hydrogen. During the voyage, canister 208 may then be connected to fuel cell system power source 203, such as by docking trolley 200 in docking station position 216, for safe low pressure hydrogen transfer from canister 208 to refuel fuel cell system power source 203.

In various embodiments, canister 208 is a replaceable part which may be removed from a trolley 200 when the hydrogen or other fuel supply is exhausted. A new or replenished cartridge 208 may then be put back in its place to provide a new fuel supply. Such removable canisters 208 could be used with either autonomous trolley 100 or semi-autonomous trolley 200. A benefit of many embodiments in which trolley 100 or 200 contains a canister 208 is that each trolley 100 or 200 can carry its own supply of hydrogen to meet its own individual need of hydrogen required to run its systems such as heating system 104, drive system 106, chilling system 205, etc. As such, adding an extra trolley 100 or 200 need not require a bigger hydrogen storage tank on board the craft because each trolley 100 or 200 has its own supply.

However, a central storage tank scaled to the number of trolleys 100 or 200 is also a possible embodiment. Embodiments thus include all alternative arrangements of fuel storage tanks and fuel cell systems, whether incorporated into the craft or the trolley, and whether configured to transfer fuel from the trolley to the craft or from the craft to the trolley. Additionally, embodiments include rechargeable trolley power or fuel supplies, whether recharged from a source inside or outside of the aircraft.

Figure 3:
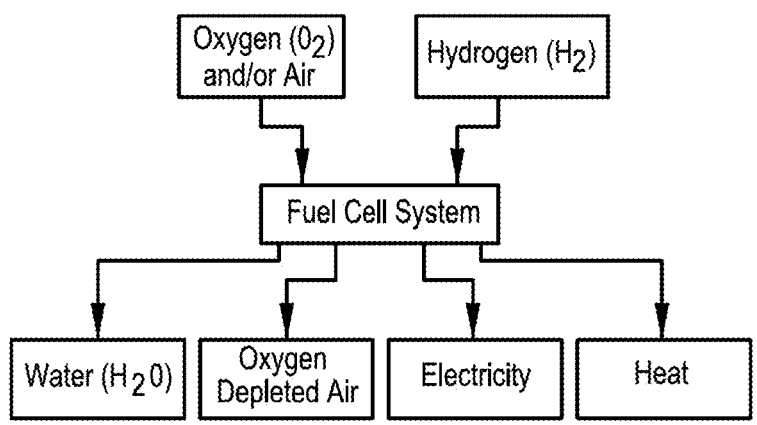
FIG. 3 shows a schematic example of input and output elements in connection with a fuel cell.

FIG. 3 shows a schematic example of input elements that may be used for a fuel cell, showing the materials needed to generate power ($O_2$ and $H_2$) and the output elements ($H_2O$, oxygen depleted air (ODA), and heat) that may be reused by the catering container functions described here, as well as additional aircraft components.

As one of the main components, a fuel cell system usually includes a fuel cell for combining the fuel source with the oxidant. However, several other components are often found in fuel cell systems, including at least one hydrogen circuit, oxygen and/or air circuit, electricity energy storage circuit, and power management circuit. A fuel cell system may (or may not) include a battery. If included, the system is a hybridized fuel cell system. Furthermore, fuel cell systems are often characterized according to type, whether that be PEMFC (Proton Exhange Membrane), SOFC (Solid Oxide), MCFC (Molten Carbonate), DMFC (Direct Methanol), AFC (Alkaline), PAFC (Phosphoric Acid) or some other newer fuel cell system technology comprising hybride solution.

Fuel sources for fuel cell systems may be different forms of hydrogen (gas, liquid, solid). Furthermore, fuel sources may be compounds other than hydrogen which generate, or can be processed to generate, the necessary hydrogen for fuel (compounds such as hydrocarbons, ammonia, etc.). The supply of oxygen is referred to as the oxidant, and it may be supplied in the form of common air, oxygen enriched air, or pure oxygen. On an airplane, the oxidant could be stored in a gas bottle, be generated onboard, or, in the case of regular air, come from the air in the atmosphere.

Figure 4:
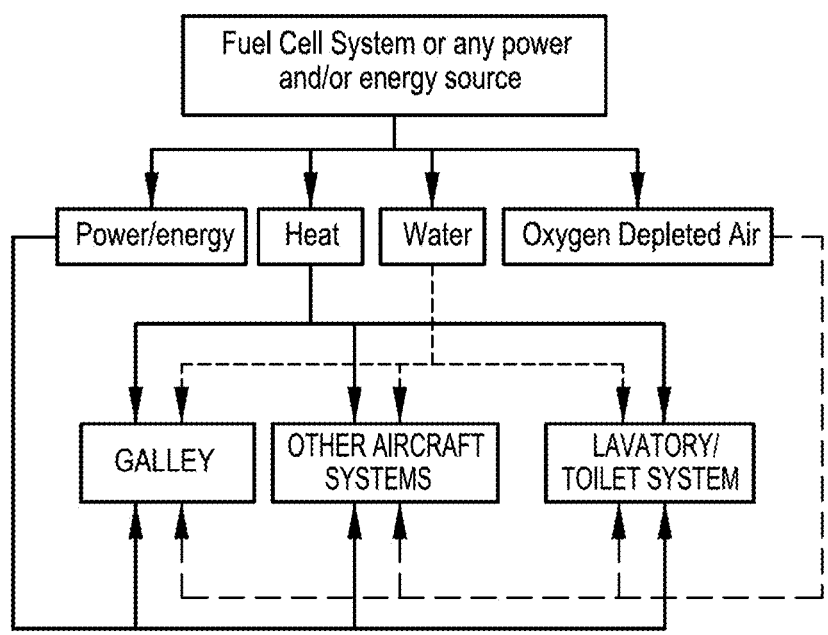
FIG. 4 shows a schematic of how fuel cells may be used to power aircraft systems.

FIG. 4 shows an example of how fuel cells may be used in connection with various aircraft components in order to provide power to those components, as well as to provide alternatives for using the fuel cell by-products for various components.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A service trolley for use in a craft, the trolley comprising:
   a container for storing chilled meals;
   a plurality of wheels attached with the container and configured to support the container relative to a support surface and to facilitate movement of the container relative to the support surface;
   a cooling system for cooling chilled meals stored in the container and a heating system for heating the chilled meals stored in the container;
   a power source housed at least partially on or at least partially within the container and configured for providing power to at least one system of the trolley housed at least partially on or at least partially within the container, wherein the power source is configured for providing power to the heating system and to the cooling system; and
   wherein the at least one system of the trolley comprises a drive-assist system powered by the power source configured to assist at least one of the plurality of wheels to turn to move the trolley.

2. The service trolley of claim 1, further comprising
   a braking system powered by the power source configured to resist turning of at least one of the plurality of wheels to resist movement of the trolley;
   a drink dispensing system powered by the power source; or
   a system for processing fruit into juice, said fruit juicing system is powered by the power source.

3. The service trolley of claim 1, wherein the power source comprises a fuel cell system.

4. The service trolley of claim 3, wherein the fuel cell system comprises a replaceable fuel cartridge.

5. The service trolley of claim 4, wherein the fuel cartridge is refillable.

6. The service trolley of claim 1, wherein the container comprises walls containing insulation.

7. The service trolley of claim 1, wherein the power source comprises an electrical energy storage device (EES).

8. The service trolley of claim 7, wherein the EES is rechargeable.

9. The service trolley of claim 8, wherein the EES is configurable for at least recharging from an electrical system of the craft or from a fuel cell system.

10. A system for recharging service trolley on a craft, the system comprising:
    at least one service trolley as defined in claim 7; wherein said EES is housed at least partially within or at least partially on the container and configured for providing power to systems of the trolley, wherein said at least one service trolley further comprises a recharging connector configured to engage with the EES for recharging of the EES; and
    at least one docking station position located on the craft and configured to receive said at least one service trolley for recharging, the at least one docking station position comprising at least one power connection to an electrical system of the craft, the at least one power connection configured to engage with an electrical system of the craft and to engage with said at least one recharging connector of at said least one EES-powered service trolley for recharging said EES of said at least one EES-powered service trolley.

11. The system of claim 10, wherein at least one docking station position is located in a cabin or a cargo bay of the craft.

12. A service trolley for use in a craft, the trolley comprising:
    a container for storing chilled meals;
    a plurality of wheels attached with the container and configured to support the container relative to a support surface and to facilitate movement of the container relative to the support surface;
    a cooling system for cooling chilled meals stored in the container and a heating system for heating the chilled meals stored in the container;
    a power source housed at least partially on or at least partially within the container and configured for providing power to at least one system of the trolley housed at least partially on or at least partially within the container, wherein the power source is configured for providing power to the heating system and to the cooling system; and
    wherein the at least one system of the trolley comprises a braking system powered by the power source configured to resist turning of at least one of the plurality of wheels to resist movement of the trolley.

13. The service trolley of claim 12, further comprising
    a drive-assist system powered by the power source configured to assist at least one of the plurality of wheels to turn to move the trolley;
    a drink dispensing system powered by the power source; or
    a system for processing fruit into juice, said fruit juicing system is powered by the power source.

14. The service trolley of claim 12, wherein the power source comprises a fuel cell system.

15. The service trolley of claim 14, wherein the fuel cell system comprises a replaceable fuel cartridge.

16. The service trolley of claim 15, wherein the fuel cartridge is refillable.

17. The service trolley of claim 12, wherein the container comprises walls containing insulation.

18. The service trolley of claim 12, wherein the power source comprises an electrical energy storage device (EES).

19. The service trolley of claim 18, wherein the EES is rechargeable.

20. The service trolley of claim 19, wherein the EES is configurable for at least recharging from an electrical system of the craft or from a fuel cell system.

21. A system for recharging service trolley on a craft, the system comprising:
    at least one service trolley as defined in claim 18; wherein said EES is housed at least partially within or at least partially on the container and configured for providing power to systems of the trolley, wherein said at least one service trolley further comprises a recharging connector configured to engage with the EES for recharging of the EES; and at least one docking station position located on the craft and configured to receive said at least one service trolley for recharging, the at least one docking station position comprising at least one power connection to an electrical system of the craft, the at least one power connection configured to engage with an electrical system of the craft and to engage with said at least one recharging connector of at said least one EES-powered service trolley for recharging said EES of said at least one EES-powered service trolley.

22. The system of claim 21, wherein at least one docking station position is located in a cabin or a cargo bay of the craft.

* * * * *